Feb. 12, 1952  H. T. ODQUIST ET AL  2,585,031
MACHINE FOR ELECTRICALLY SEALING FIBER CONTAINERS
Filed May 26, 1947  3 Sheets-Sheet 3
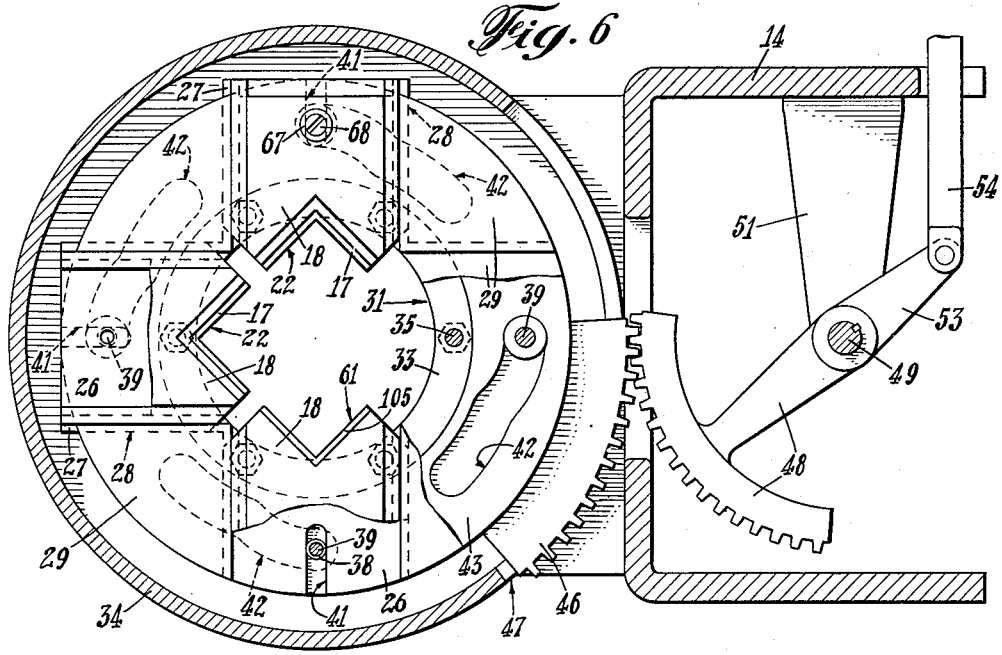
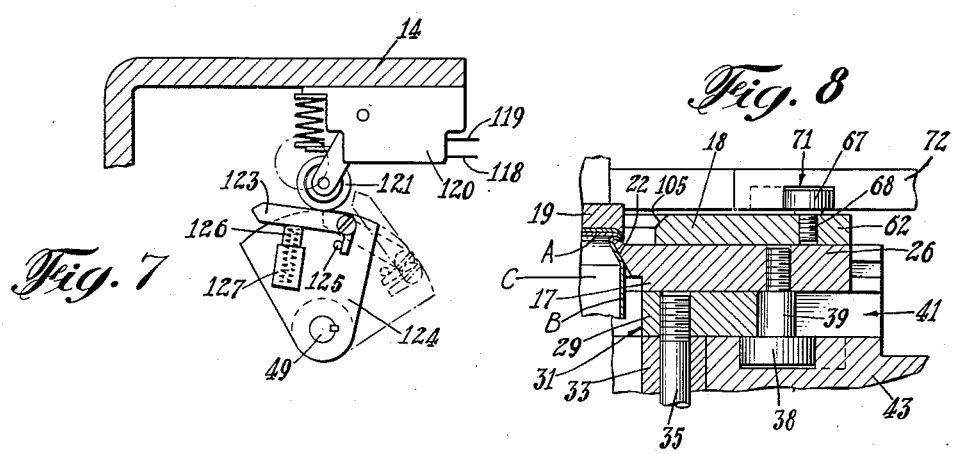
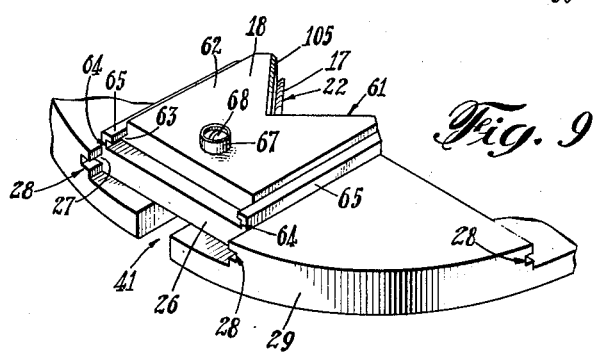
INVENTORS
Harold T. Odquist
Eugene W. Macoy
BY Ivan D. Thornburgh
Charles H. Erne
ATTORNEYS Patented Feb. 12, 1952

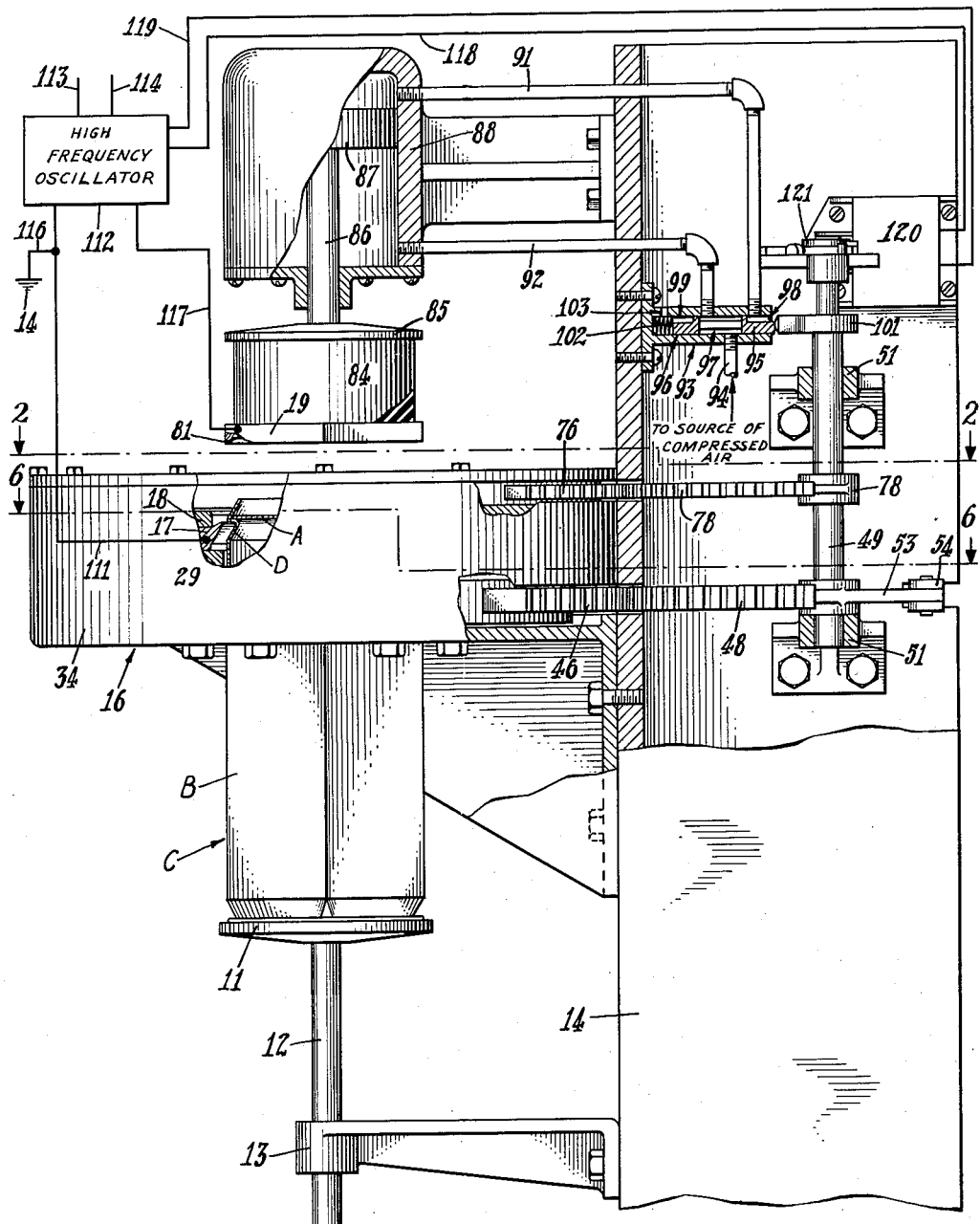

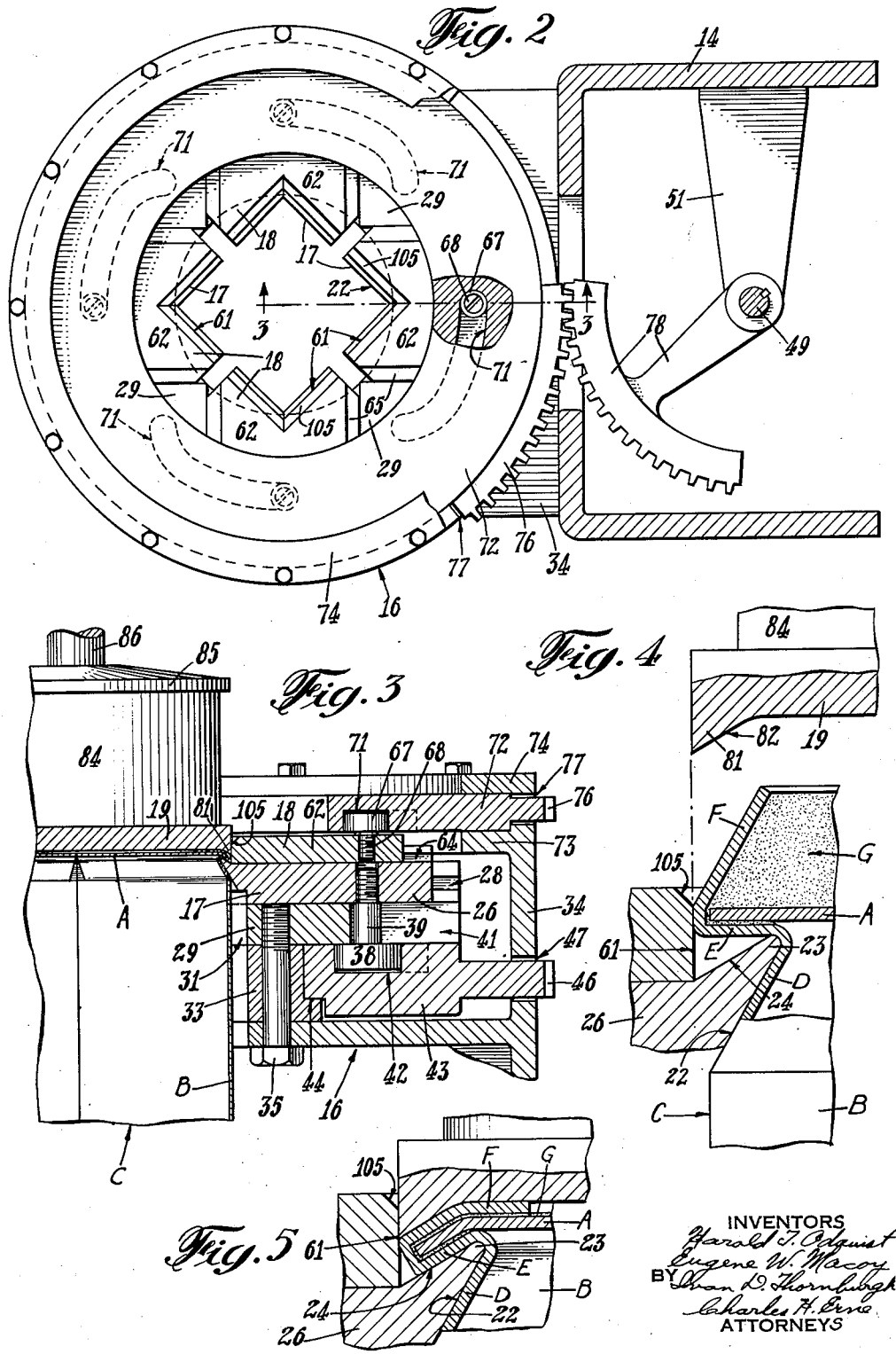

2,585,031

UNITED STATES PATENT OFFICE 2,585,031

MACHINE FOR ELECTRICALLY SEALING FIBER CONTAINERS

Harold T. Odquist, Yonkers, N. Y., and Eugene W. Macoy, Old Greenwich, Conn., assignors to American Can Company, New York, N. Y., a corporation of New Jersey Application May 26, 1947, Serial No. 750,492

3 Claims. (Cl. 93—55.1)

The present invention relates to a machine for sealing a fibre container cover onto a fibre container body by an interfolding of parts thereof with an interposed thermoplastic or thermosetting adhesive, and has particular reference to devices for interfolding and supporting the container parts and for dielectrically heating the adhesive for bonding the interfolded parts together.

An object of the invention is the provision in a machine for sealing a fibre container cover onto a fibre container body by an interfolding of parts thereof with an interposed thermoplastic or thermosetting adhesive, of devices wherein the interfolding and bonding of the container parts may be effected accurately and at high speed with a minimum heating of the parts of the devices and the walls of the container parts.

Another object is the provision in such a machine of devices wherein the thermoplastic adhesive or thermosetting adhesive interposed between the container parts to be secured together is heated dielectrically by an electrostatic current passed through the adhesive so that the adhesive will be converted into a tacky condition for bonding the container parts together while maintaining the container walls at a relatively cool temperature for overcoming deleterious effects of excessive heat on the container walls.

Another object is the provision in such a machine of devices for properly retaining the container parts to be interfolded in accurately located positions during the interfolding operations, the devices being retractable upon completion of the interfolding operation so as to be clear of the container parts during the adhesive heating operation.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a machine embodying the instant invention, with parts broken away and shown in section, the view including a wiring diagram of the electric apparatus used in the machine;

Fig. 2 is a horizontal section taken substantially along the broken line 2—2 in Fig. 1, with parts broken away;

Fig. 3 is an enlarged sectional view of a portion of the machine and showing a portion of a container in place in the machine, the view being taken substantially along the line 3—3 in Fig. 2;

Figs. 4 and 5 are enlarged fragmentary views of a container to be sealed and adjacent parts of the machine, Fig. 4 showing the container and the position of the machine parts before the container is sealed, and Fig. 5 showing the container and machine parts in position during the sealing operations;

Fig. 6 is a view similar to Fig. 2 and taken substantially along the broken line 6—6 in Fig. 1, with parts broken away;

Fig. 7 is a sectional detail of the machine, with parts broken away;

Fig. 8 is a fragmentary sectional view similar to Fig. 3 and showing parts of the machine in a different position; and Fig. 9 is a perspective view showing a detail of the machine.

As a preferred embodiment of the instant invention the drawings illustrate principal parts of a machine for sealing covers A (Figs. 1, 3, 4 and 5) which may be bottom or top members, onto bodies B of fibre containers C, such as for example, the fibre milk container disclosed in United States Patent 2,085,979 issued July 6, 1937, to J. M. Hothersall on Container. In such a container the body B adjacent its ends is formed with an inwardly extending bead D which sets off in the container a flat shoulder or seat E for the cover or end member. The shoulder merges into a projecting annular flange F. The inner surfaces of the flange and the shoulder carry a film of solidified thermoplastic adhesive G. The end member A may also carry a band of this adhesive on its outer surface adjacent its periphery.

In producing the container C, the cover or end member A is inserted into place within the container and against its seat E as best shown in Fig. 4. The flange F is then bent inwardly toward the cover to temporarily hold the cover in place. It is in this condition with the cover loosely applied to the body that the container is received for sealing in the machine embodying the devices of the instant invention.

In the machine, the containers C are received on a lifter pad 11 (Fig. 1) mounted on a vertically disposed stem 12 carried in a bearing bracket 13 bolted to a frame 14 which may constitute the main frame of the machine, although the invention is equally well adapted to a machine having the pad 11 disposed in a horizontal position if desired. The pad 11 is movable vertically for lifting the container and its loosely applied cover into a closing head 16 for sealing and for lowering the sealed container to its original position for discharge. This movement of the pad may be effected in any suitable manner in time with the other moving parts of the machine.

The closing head 16 is disposed preferably above and in alignment with the lifter pad 11 and includes support and retainer jaws 17, 18 (Figs. 1 and 3) respectively and a chuck 19. There are four support jaws 17 (see also Figs. 6 and 9) arranged to completely surround a container lifted into the head 16 and to engage under and support or back up the shoulder E of the container. For this purpose the inner edges of the jaws are shaped to fit the peripheral contour of the container. For a square or rectangular shaped container as shown in the drawings, each jaw is formed with a pair of inwardly tapered faces 22 (Fig. 4) disposed at an included angle of ninety degrees for snug fit around a corner of the container, the tapered faces being arranged to fit within the bead D of the container. The upper edges of these jaw faces are formed with a rounded nose 23 and a pair of outwardly tapered seam forming faces 24 which are disposed adjacent the inner faces 22.

The support jaws 17 are mounted for simultaneous reciprocating movement toward and away from the container C. For this purpose the jaws are formed on the inner ends of jaw bodies 26 (Figs. 3 and 9) having laterally extending slide tongues 27 (see also Fig. 6) disposed in slideways 28 formed in a horizontal support plate 29. This plate is provided with a centrally disposed opening 31 through which the container C is introduced into the closing head 16. The plate rests on top of a support ring 33 which is located in a housing 34 bolted to or formed as a part of the machine frame 14. Bolts 35 extending up through the housing and the ring and threadedly secured in the plate, tie together securely all of these parts.

The support jaws 17 are reciprocated in their slideways 28 in the support plate 29 by cam action in time with the other moving parts of the machine. This is brought about by cam rollers 38 (Figs. 3, 6 and 8) which are mounted on the lower ends of studs 39 carried in the jaw bodies 26. There is one cam roller and one stud for each jaw. The stems extend up through clearance slots 41 formed in the support plate 29.

The cam rollers 38 operate in short cam grooves 42 formed in an oscillatable ring cam 43. There are four of these grooves, one for each jaw 17. This cam surrounds the support ring 33 and operates on a shoulder 44 (Fig. 3) formed in the ring. The cam is oscillated through a partial rotation on the ring shoulder 44 by a segment gear 46 (Figs. 3 and 6) formed on the outer edge of the cam. This segment gear projects through an opening 47 in the housing 34 and meshes with a segment arm 48 located outside the housing.

The segment arm 48 (Figs. 1 and 6) is mounted on a vertical shaft 49 carried in a pair of spaced bearing brackets 51 bolted to the machine frame 14. The shaft is periodically rocked through an operating stroke and thence through a return stroke by an actuating arm 53 formed on the segment arm 48. The actuating arm may be rocked in any suitable manner in time with the other moving parts of the machine by a link connection 54 with a suitable source of motive power.

Hence when the actuating arm 53 is rocked in one direction, it rocks the segment arm 48 and thus partially turns the cam 43 for shifting the support jaws 17 inwardly toward the elevated container C and thus brings the jaws into position around the container and under its shoulder E for supporting the shoulder as hereinbefore mentioned. This closed position of the support jaws is shown in Figs. 3, 4, 5 and 8.

After the support jaws 17 have moved into the container shoulder supporting position as explained above, the retainer jaws 18 move inwardly for engagement with the outer peripheral edge of the shoulder for backing it up and for retaining it in proper position for the sealing operation. This backing up of the outer edge of the shoulder establishes engagement of the shoulder with the peripheral edge of the cover A and thus insures against a pocket or space at the edges of the cover.

There are four retainer jaws 18 (see Fig. 2), one for each support jaw 17 and they are formed with angularly disposed vertical faces 61 (Figs. 4 and 5) for engagement with the peripheral outer edge of the shoulder E. These faces are disposed ninety degrees apart for engagement around the corner of the container in a fashion similar to the support jaws 17. The jaws normally are in an open position as shown in Figs. 1 and 8, but when closed they completely surround the peripheral edge of the shoulder E.

The retainer jaws 18 are disposed for sliding movement on top of the support jaws 17 (see Fig. 9) and are formed with a body 62 having a pair of laterally extending tongues 63 which slide in slideways 64 provided in ribs 65 extending up from the support jaws 17.

Reciprocating movement of the retainer jaws 18 through an inward or retaining stroke and thence through a return stroke, is effected by cam action. For this purpose each of the jaw bodies 62 carries a cam roller 67 (Figs. 2, 3, 8 and 9) which is mounted on a stud 68 carried in the bodies 62. These cam rollers operate in short cam grooves 71 of an oscillatable ring cam 72 supported on a ledge 73 formed in the housing 34. The outer edge of the cam slides against the inner surface of the housing, while a retainer ring 74 bolted to the top edge of the housing retains the cam in place against its support ledge.

The ring cam 72 is periodically oscillated in time with the other moving parts of the machine by a segment gear 76 (Figs. 2 and 3) formed on the outer edge of the cam. The gear projects through a clearance opening 77 formed in the housing 34. Beyond the housing, the segment gear 76 meshes with a segment arm 78 which is mounted on and rocks with the rock shaft 49.

Hence when the rock shaft 49 rocks through its operating stroke for shifting the support jaws 17 into closed position around the container C and under its shoulder E for supporting the shoulder, the shaft also rocks the segment arm 78 in timed sequence and thus partially turns the cam 72 for shifting the retainer jaws 18 into closed position around the peripheral edge of the shoulder E as explained above.

While the shoulder E of the container C is thus supported from below and retained in proper position adjacent its outer periphery by the closed supporting and retaining jaws 17, 18 the upwardly projecting flange F, initially disposed in an angular position as best shown in Fig. 4, is folded down tight against the loosely applied cover A preparatory to the sealing or bonding together of these interfolded container parts. This interfolding of the container body and cover parts is effected by the chuck 19.

The chuck 19 preferably is a flat disc having a shape substantially that of the shape of the top of the container to be closed. The bottom face of the chuck adjacent its outer periphery is formed with a depending skirt 81 (Figs. 1, 3 and 4) having an inner tapered face 82 corresponding to the outer tapered faces 24 of the support jaws 17. This chuck is disposed above the jaws 17, 18 and in alignment with the lifter pad 11.

The chuck 19 is mounted for vertical reciprocatory movement toward and away from the upper end of the container disposed in the closing head 16 and is secured to the lower face of a spacer block 84 of a suitable dielectric material, such as quartz, polystyrene, or any other suitable dielectric. The spacer block 84 is secured to the lower face of a plate 85 attached to the lower end of a vertically movable piston rod 86 of a piston 87 housed in a cylinder 88 carried on the machine frame 14, although the invention is equally well adapted to a mechanical mounting for and movement of the spacer block 84 and the chuck 19 connected therewith.

The piston 87 is moved within its cylinder 88 preferably by compressed air received from any suitable source of supply of such air. For this purpose the cylinder adjacent its ends is connected by way of pipe lines 91, 92 (Fig. 1) to a plunger valve 93, the terminal ends of the pipes being in spaced relation as shown in Fig. 1. The opposite side of the valve is connected by a supply pipe 94 to a suitable source of supply of compressed air. The valve end of the supply pipe 94 is disposed in a position midway between the terminal ends of the pipes 91, 92.

The valve 93 contains a slidable plunger 95 disposed within a bore 96 formed in the body of the valve. Intermediate its ends the plunger is formed with a wide groove 97. The sides of the plunger are provided with longitudinal vent channels 98, 99. The outer end of the plunger extends beyond the body of the valve and engages against an edge cam 101 carried on and partially rotated by the rock shaft 49. The inner end of the plunger is backed up by a compression spring 102 which is disposed in the inner end of the bore 96. The spring holds the plunger under pressure against the cam.

The timing of the edge cam 101 is such that upon completion of the inward or closing stroke of the support jaws 17 and the retaining jaws 18, the valve plunger 95 is shifted into a position wherein its groove 97 connects the air supply pipe 94 with the pipe 91. In this position of the plunger the vent channel 99 is adjacent the terminal end of the pipe 92.

Hence compressed air from the supply pipe 94 is directed through the pipe 91 to the upper end of the cylinder 88. Air entering this end of the cylinder forces the piston down. Air in the lower end of the cylinder is exhausted or forced out by way of the pipe 92 and vent channel 99. This exhausted air passes through the inner end of the bore 96 and through a vent hole 103 in the valve body 93 and out into the atmosphere.

The downward movement of the piston 87 moves the chuck 19 attached thereto, down against the angularly disposed flange F of the elevated container C and bends the flange down toward the loosely applied cover A. As the piston continues to move down, the tapered faces 82 of the chuck compresses the flange F, the outer peripheral edge of the cover A, and the shoulder E downwardly at an angle against the seam forming outer faces 24 of the support jaws 17 as shown in Fig. 5. The flat bottom face of the chuck also forces the terminal edge of the flange down flat against the cover A and presses the cover against the shoulder E supported by the underlying nose 23 of the support jaws 17.

This interfolding of the container parts is effected while the retainer jaws 18 are in engagement with the outer peripheral edge of the container shoulder E, this edge of the shoulder being forced downwardly along the jaw faces 61 during the interfolding operation. The upper edges of the jaw faces 61 are beveled as at 105 to facilitate entrance of the chuck 19.

The interfolding of the container parts A, E and F against the nose 23 and tapered surfaces 24 of the support jaws 17, arrests further downward movement of the chuck. While the chuck thus holds the interfolded parts of the container in position tightly against the support jaws 17 the retainer jaws 18 back away from the container as shown in Fig. 8 to create an electrical clearance or space between them and the container in preparation for the bonding together of the parts by the adhesive. This backward movement of the retainer jaws is effected by the rock shaft 49 as it begins to rock through its return oscillation. The chuck 19 and the support jaws 17 remain stationary temporarily to support and clamp the interfolded container parts.

Bonding together of the interfolded container parts A, E and F is effected by electronically heating the thermoplastic adhesives G previously applied to the inner surfaces of the container parts E and F. For this purpose the support jaws 17 are connected by a lead wire 111 (Fig. 1) to a conventional high frequency oscillator unit 112 receiving electric current by way of wires 113, 114 from any suitable source of such current. A radio frequency current ranging between 20 megacycles and 80 megacycles has been found satisfactory. However, a wider range of frequencies is definitely contemplated by and understood to be included in the scope of this invention. The lead wire 111 preferably is grounded by a connecting wire 116 to the machine frame 14.

The oscillator unit 112 is also connected by a wire 117 to the chuck 19 (see also Fig. 7). Wires 118 and 119 connect the oscillator to a normally open switch 120 having a spring held actuating element 121. The switch actuating element 121 is backed up by a spring located on the switch casing and is operable in one direction only for closing the switch. The spring immediately opens it after a closing operation.

Momentary closing of the switch is effected preferably by a spring held pawl 123 (Fig. 7) which is pivotally carried on a segment 124 mounted on the rock shaft 49. The pawl is held against a stop lug 125 on the segment 124 by a spring barrel 126 disposed in a housing 127 formed on the side of the segment. The pawl is arranged to engage and shift the switch actuating element 121 on the return oscillation only of the rock shaft and to pass under the actuating element in a depressed condition without operating it on the forward oscillation of the shaft.

Hence as soon as the retainer jaws 18 have backed away clear of the container, the pawl 123 momentarily closes the switch 120 while the rock shaft 49 continues its return oscillation. Closing of the switch 120 operates a control relay in the H. F. oscillator to supply a high frequency dielectric current to the interfolded container elements A, E and F, including the adhesive by way of wire 117, chuck 19, jaws 17 and wire 111.

The adhesive is a dielectric material. In such a circuit the interfolded container parts act as the dielectric of a condenser. An electrostatic field is set up in these interfolded parts and the lines of force of the field passes through the dielectric adhesives. The spacer block 84 secured to the top of the chuck insulates the chuck 19 from the plate 85 and reduces the electrostatic fringing or losses from the chuck to plate 85 and the upper parts of the machine.

As a result the adhesive becomes heated and is thus reduced rapidly to a sticky or tacky condition. It is this momentary rapid heating of the adhesive that bonds together the interfolded parts of the container and produces an hermetic seam securing the cover A to the container body B. Since this adhesive heating operation is of a momentary nature the sealing of the container takes place very rapidly.

Following the sealing operation the container is released for removal from the machine, the chuck 19 being lifted from the container to its original position as the first step in this release. This is brought about by an outward movement of the valve plunger 95 under the force of the spring 102 as the cam 101 turns with the rock shaft 49 through its return oscillation. This movement of the valve plunger shifts its groove 97 out of communication with the pipe line 91 of the cylinder 88 and brings it into communication with the pipe line 92 as shown in Fig. 1.

Thus compressed air from the main supply pipe 94 is permitted to flow into the cylinder 88 below the piston 87 and thereby raises the piston and the chuck 19 connected therewith. Air in the cylinder above the piston is forced out through the pipe line 91 and vent channel 93 in the valve plunger 95 and is thus exhausted to the atmosphere.

While the chuck 19 is thus being lifted from the container, the support jaws 17 move outwardly under the action of their actuating cam 43 as it is oscillated through its return stroke by the rock shaft 49. Thus the sealed container is free of the closing head parts. The lifter pad 11 thereupon moves down to its original position. This movement of the lifter pad brings the container into a position below the closing head and from which it may be readily removed from the machine in any suitable manner. This completes the operations on the container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a container closing machine for securing with an interposed thermoplastic adhesive a fibre container cover in place within a fibre container body by an interfolding of marginal cover flange parts with projecting annular flange parts of the container body and against a shoulder formed by an inwardly extending bead in the body, the combination of support jaws surrounding the container body and engageable under the shoulder of the container body for supporting said shoulder, a chuck engageable with the flange of said body for pressing the flange against the cover and the cover against the shoulder, retainer jaws disposed adjacent said support jaws for engaging and backing up the outer periphery of the body shoulder during initial engagement between the chuck and the cover and body parts, means for retracting said retainer jaws after said cover and body parts are tightly held by said chuck to provide only the fibrous mass of cover and container parts in engagement with said support jaws and said chuck, electric means supplying high frequency electric current connecting with said support jaws and with said chuck, and a timing switch operable on said electric means after retraction of said retainer jaws for creating an electrostatic field passing through said thermoplastic adhesive for dielectrically heating and melting said adhesive for bonding said interfolded container and cover parts together.

2. In a container closing and sealing machine adapted to seal a fiber container cover onto a fiber container body by an interfolding of marginal cover and body flange and shoulder parts with an interposed thermoplastic adhesive, the combination of a closing head including a jaw and a chuck, said jaw having a tapered seam forming face for engaging under said body shoulder, said chuck having a marginal depending skirt formed with a surface parallel to the seam forming face of said jaw for engaging above said body flange, means for bringing said jaw into supporting position under said body shoulder, means for lowering said chuck onto said interfolded seam parts supported by said jaw to cause its marginal depending skirt to bend down and to squeeze together the interposed interfolded marginal cover and body flange and shoulder parts to form a seam, a retainer member carried by said jaw, means for moving said retainer member on said jaw to back up said interfolded seam parts during squeezing, said retainer moving means also retracting said retainer member after said squeezing action, electric means for supplying high frequency electric current connecting with said jaw and with said chuck, and a timing switch for making said electric means effective when the cover and body parts are squeezed together and after retraction of said retainer member for creating an electrostatic field passing through the thermoplastic adhesive in the seam to dielectrically heat and melt said adhesive for bonding together said squeezed interfolded cover and body parts in the seam.

3. In a container closing and sealing machine adapted to seal a fiber container cover onto a fiber container body by an interfolding of marginal cover and body flange and shoulder parts in a seam with an interposed thermoplastic adhesive, the combination of a support jaw having a seam forming face for engaging said container body shoulder during formation of the seam, a retainer jaw movable relative to said support jaw for holding the seam parts against lateral displacement during the folding thereof, a chuck movable relative to said support jaw and having a marginal skirt section for engaging said body flange while it is supported on the seam forming face of said support jaw, means for moving said jaws into seam forming position, means for moving said chuck to squeeze the interfolded marginal cover and body flange and shoulder parts against said support jaw to form the seam, means for withdrawing said retainer jaw from the seam after said chuck movement has ceased to provide only a fibrous mass between said support jaw and said chuck, and electric means supplying high frequency electric current connecting with said support jaw and with said chuck and operative after withdrawal of said retainer jaw leaving the cover and body parts as the only intervening medium between the support jaw and chuck for creating an electrostatic field passing through the thermoplastic adhesive in the seam to dielectrically heat and melt said adhesive for bonding together said interfolded cover and body parts in the seam.

HAROLD T. ODQUIST.
EUGENE W. MACOY.

REFERENCES CITED

The following references are of record in the file of this patent:

UNITED STATES PATENTS

| Number | Name | Date |
|---|---|---|
| 2,264,317 | Koehler | Dec. 2, 1941 |
| 2,276,332 | Nordquist | Mar. 17, 1942 |
| 2,399,250 | Peters | Apr. 30, 1946 |
| 2,438,498 | Geist et al. | Mar. 30, 1948 |